(12) United States Patent
Yoon et al.

(10) Patent No.: US 12,197,890 B2
(45) Date of Patent: Jan. 14, 2025

(54) MULTIPLIER AND ADDER IN SYSTOLIC ARRAY

(71) Applicant: Google LLC, Mountain View, CA (US)

(72) Inventors: Doe Hyun Yoon, Foster City, CA (US); Lifeng Nai, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 421 days.

(21) Appl. No.: 17/377,743

(22) Filed: Jul. 16, 2021

(65) Prior Publication Data
US 2023/0015148 A1 Jan. 19, 2023

(51) Int. Cl.
| | |
|---|---|
| *G06F 7/544* | (2006.01) |
| *G06F 7/50* | (2006.01) |
| *G06F 7/53* | (2006.01) |
| *G06F 7/533* | (2006.01) |
| *G06F 15/80* | (2006.01) |

(52) U.S. Cl.
CPC .............. *G06F 7/5443* (2013.01); *G06F 7/50* (2013.01); *G06F 7/5312* (2013.01); *G06F 7/533* (2013.01); *G06F 15/8046* (2013.01)

(58) Field of Classification Search
CPC ........... G06F 7/52–5375; G06F 7/5443; G06F 17/16; G06F 15/8046
See application file for complete search history.

(56) References Cited

U.S. PATENT DOCUMENTS

| | | | |
|---|---|---|---|
| 4,228,520 A | 10/1980 | Letteney et al. | |
| 4,864,529 A * | 9/1989 | Shah | G06F 7/5334 708/630 |
| 4,876,660 A * | 10/1989 | Owen | G06F 7/544 708/603 |

(Continued)

FOREIGN PATENT DOCUMENTS

| | | |
|---|---|---|
| JP | S55147738 A | 11/1980 |
| JP | 2018521374 A | 8/2018 |
| JP | 2018195228 A | 12/2018 |

OTHER PUBLICATIONS

G. Bewkick and M. Flynn, Binary multiplication using partially redundant multiplies, 1992, Computer Systems Laboratory, Stanford University. (Year: 1992).*

(Continued)

*Primary Examiner* — Matthew D Sandifer
(74) *Attorney, Agent, or Firm* — Lerner David LLP

(57) ABSTRACT

The subject matter described herein provides systems and techniques for the design and use of multiply-and-accumulate (MAC) units to perform matrix multiplication by systolic arrays, such as those used in accelerators for deep neural networks (DNNs). These MAC units may take advantage of the particular way in which matrix multiplication is performed within a systolic array. For example, when a matrix A is multiplied with a matrix B, the scalar value, a, of the matrix A is reused many times, the scalar value, b, of the matrix B may be streamed into the systolic array and forwarded to a series of MAC units in the systolic array, and only the final values and not the intermediate values of the dot products, computed for the matrix multiplication, may be correct. MAC unit hardware that is particularized to take advantage of these observations is described herein.

20 Claims, 11 Drawing Sheets

(56) References Cited

U.S. PATENT DOCUMENTS

| | | | | |
|---|---|---|---|---|
| 5,490,101 | A * | 2/1996 | Lee | G06F 7/53 708/628 |
| 5,661,673 | A * | 8/1997 | Davis | G06F 7/5338 708/628 |
| 5,938,763 | A * | 8/1999 | Fimoff | G06F 7/785 712/300 |
| 6,035,316 | A | 3/2000 | Peleg et al. | |
| 7,343,388 | B1 * | 3/2008 | Burney | G06F 5/01 708/209 |
| 8,307,023 | B1 * | 11/2012 | Leung | G06F 7/5324 708/625 |
| 9,411,554 | B1 * | 8/2016 | Young | G06F 7/5324 |
| 10,466,968 | B1 * | 11/2019 | Elkin | G06F 7/523 |
| 11,113,233 | B1 * | 9/2021 | Volpe | G06F 15/8046 |
| 11,816,446 | B2 * | 11/2023 | Elmer | G06F 7/5443 |
| 2003/0069913 | A1 * | 4/2003 | Deng | G06F 7/5443 708/603 |
| 2003/0182343 | A1 * | 9/2003 | Hojsted | G06F 7/5336 708/625 |
| 2013/0138711 | A1 | 5/2013 | Sugisawa | |
| 2015/0254066 | A1 * | 9/2015 | Lutz | G06F 5/012 708/205 |
| 2016/0342892 | A1 | 11/2016 | Ross | |
| 2018/0336013 | A1 | 11/2018 | Kitamura | |
| 2020/0057609 | A1 * | 2/2020 | Kennedy | G06F 9/3802 |
| 2020/0285445 | A1 * | 9/2020 | Sakamoto | G06F 7/5334 |
| 2021/0209190 | A1 * | 7/2021 | Kung | G06F 7/5443 |
| 2022/0164164 | A1 * | 5/2022 | Kwon | G06F 7/5443 |

OTHER PUBLICATIONS

A. Al-Khalili, Parallel Adders, COEN 6501/2 -HH: Digital Design and Synthesis Lecture Notes, Concordia University, pp. 1-5. Available online at https://users.encs.concordia.ca/~asim/COEN_6501/Lecture_Notes/L2_Notes.pdf. Retrieved from a PDF captured by a Wayback Machine Snapshot on Dec. 14, 2010. (Year: 2010).*

International Search Report and Written Opinion for International Application No. PCT/US2022/035660 dated Oct. 19, 2022. 17 pages.

Khurshid et al. Technology-Dependent Optimization of FIR Filters based on Carry-Save Multiplier and 4:2 Compressor unit. Electronics ETF, vol. 20, No. 2, Dec. 31, 2016 (Dec. 31, 2016), 12 pages. Retrieved from the Internet: <http://doisrpska.nub.rs/index.php/electronics/article/viewFile/3544/3382>. [retrieved on Oct. 11, 2022].

Bewick and Flynn. Binary Multiplication Using Partially Redundant Multiples. Jun. 1992. Technical Report No. CSL-TR-92-528. Computer Systems Laboratory Departments of Electrical Engineering and Computer Science, Stanford University, Stanford, California 94305-4055. 28 pages.

Dinechin et al. Table-Based versus Shift-And-Add constant multipliers for FPGAs. Jun. 2019. 2019 IEEE 26th Symposium on Computer Arithmetic (ARITH). DOI 10.1109/ARITH.2019.00037, pp. 151-158.

Koenig et al. A Hardware Accelerator for Computing an Exact Dot Product. Jul. 2017. Department of Electrical Engineering and Computer Sciences, University of California, Berkeley, Berkeley, USA. 8 pages.

Tricks. Floating-Point Unit Generator. Stanford. Retrieved on Jul. 16, 2021. Retrieved from the Internet: <https://sites.google.com/a/stanford.edu/fpgen/tricks>. 3 pages.

Office Action for Japanese Patent Application No. 2023-548943 dated Sep. 10, 2024. 4 pages.

* cited by examiner

MULTIPLIER AND ADDER IN SYSTOLIC ARRAY

BACKGROUND

Recently, accelerators for neural networks, such as deep neural networks (DNN), have leveraged systolic arrays for high-density computation. A systolic array may be a 2D array of multiply-and-accumulate (MAC) units with a weight-stationary approach used for dense matrix multiplication. A systolic array may instead be a 2D array of MAC units that use an output-stationary structure or some other structure. A commonly used hardware design used in multipliers within MAC units is a Booth (or a modified Booth) multiplier. Such a multiplier multiplies two scalar numbers, such as a and b of matrices A and B, respectively, by: preparing partial products from a, Booth encoding b, accumulating partial products to two terms such as by using a carry save adder (CSA) tree or tree reduction, and by outputting the result in to a final carry propagation adder (CPA) to derive the result of the multiplication. The number of partial products, which may be approximately n/2 using a Radix-4 Booth2 multiplier, n/3 using a Radix-8 Booth3 multiplier, and n/4 using a Radix-16 Booth4 multiplier, may be important in determining the tree reduction complexity. In practice Booth2 multipliers are used in most cases and Booth3 multipliers are used in other cases. Higher radix multipliers may seldom be used because of difficult-to-compute "hard multiples." In Booth2 multipliers, the partial products may include 0, ±a, and ±2a. However, in Booth3 multipliers the partial products may additionally include ±3a and ±4a. Here, because 3a is not a power of 2 it may be known as a hard multiple, which unlike the other partial products, has to be computed before other steps in the multiplication of a and b are carried out. Higher radix multiplier designs may have more hard multiples that have to be computed. The requirements for computing hard multiples makes existing higher-radix Booth multiplier designs impractical and inefficient. In addition, the conventional MAC unit adder may add the products of the multiplier to a partial sum and pass on the result to a next MAC unit in a systolic array in an inefficient and un-optimized manner. For example, there may be inefficiencies in the design of such conventional adders, which do not take into account their implementation in a systolic array for matrix multiplication.

BRIEF SUMMARY

Efficiency in systolic array-based matrix multiplication may be important in the design of accelerators, such as DNN accelerators. More efficient and practical multiplier and adder designs for use in MAC units for a systolic array are described herein. Examining conventional MAC units used for matrix multiplication, of a matrix A with a matrix B in a systolic array, three observations may be made:

First, a scalar value, a, in the matrix A, may be reused many times once it is loaded and latched by a flip/flop of a MAC unit in the systolic array. For example it may be reused as many times as the width of the matrix B, which may normally be wide. The scalar value, a, may be reused several times until it is re-loaded.

Second, a scalar value, b, in the matrix B may be streamed into the systolic array. In particular, the same scalar value, b, may be forwarded to a series of MAC units in a row of the systolic array.

Third, MAC units in a column of the systolic array together may compute a dot product using a row in the matrix A and a column in the matrix B. Only the final value of the dot product computations may be used to derive the result. In particular, an intermediate value, i.e. the partial sum, in each MAC unit in the systolic array may not have to be correct, as long as the computation of the final dot product is correct.

Based on the observations above, with respect to the operation of conventional MAC units in a systolic array, enhanced multipliers and adders for MAC units in a systolic array may be designed. In particular, the multiplier and the adder conventionally found in each MAC unit may be fused together, and possibly use additional components, to produce an enhanced MAC unit that may take advantage of the above observations. The enhanced MAC unit may make use of a higher radix multiplication, which may simplify the CSA tree reduction. The enhanced MAC unit may be faster, may be more efficient, may be optimized for performing matrix multiplication, may include less hardware, and may be more energy efficient when compared to a conventional MAC unit. The enhanced MAC unit may include these and other advantages when it is used for matrix multiplication, of a matrix, A, with a matrix, B, in a systolic array, such as those used for accelerators for DNNs.

Several example structures of such enhanced MAC units are provided herein. In general, one aspect of the subject matter described in this specification includes a multiply-and-accumulate (MAC) unit for multiplying two numbers to produce a result. The MAC unit may include a first flip/flop, a second flip/flop, a multiplexer, at least one carry save adder, and multiple parallel segmented adders. The first flip/flop may be configured to latch a first number and to output the first number and a multiple number based on the first number. The second flip/flop may be configured to load a second number and to output the second number. The multiplexer may be in communication with the first flip/flop and the second flip/flop, and may be configured to receive the first number and the multiple number from the first flip/flop and the second number from the second flip/flop. The multiplexer may be configured to output a plurality of partial products based on the first number, the multiple, number, and the second number. The at least one carry save adder may be in communication with the multiplexer. The at least one carry save adder may be configured to receive the plurality of partial products, and a partial sum, and to output at least two partially summed numbers based on the plurality of partial products and the partial sum. The multiple parallel segmented adders may be in communication with the at least one carry save adder. The multiple parallel segmented adders may be configured to receive the at least two partially summed numbers, perform an addition operation on the at least two partially summed numbers, and to output the result. The second number may be encoded using Booth encoding. The MAC unit may include at least one hard multiple calculator. The at least one hard multiple calculator may be in communication with the first flip/flop, and may be configured to receive a preloaded number and to output the multiple number to the first flip/flop. The at least one carry save adder may include solely a multi-to-two carry save adder. The at least one carry save adder may include a carry save adder and a multi-to-two carry save adder. The MAC unit may include a third flip/flop. The third flip/flop may be in communication with the multi-to-two carry save adder, and may be configured to load the partial sum and to output the partial sum to the multi-to-two carry save adder. The third flip/flop may be configured to load the partial sum from a partial sum output from another MAC unit. The multiple parallel segmented adders are configured to operate in parallel on segments of numbers that are in a partially redundant form. The first flip/flop may be configured to latch the first number at two times the normal clock speed. The MAC unit may be an enhanced MAC unit that uses a fused version of a multiplier and adder. The MAC unit may be within a systolic array.

Another aspect of the subject matter includes a multiply-and-accumulate (MAC) unit. The MAC unit may include a first flip/flop, a second flip/flop, a third flip/flop, a multiplier, and an adder. The first flip/flop may be configured to latch a first number and output to the first number. The second flip/flop may be configured to latch a multiple number based on the first number and to output the multiple number. The third flip/flop may be configured to load a second number and to output the second number. The multiplier may be in communication with the first, second, and third flip/flops. The multiplier may be configured to receive the first number from the first flip/flop, the multiple number from the second flip/flop, and the second number from the third flip/flop. The multiplier may be configured to produce partial products based on the first number, the multiple number, and the second number. The multiplier may be configured to output the partial products. The adder may be in communication with the multiplier. The adder may be configured to receive the partial products from the multiplier. The adder may be configured to add the partial products with a partial sum number to produce a result. The MAC unit may include a double data rate flip/flop configured to latch the first number and the multiple number at two times the normal clock speed. The MAC unit may include a demultiplexer in communication with the double data rate flip/flop, and the first and the second flip/flops. The demultiplexer may be configured to receive the first number and the multiple number from the double data rate flip/flop, output the first number to the first flip/flop, and output the multiple number to the second flip/flop. The MAC unit may include a fourth flip/flop. The fourth flip/flop may be in communication with the adder, and may be configured to load the partial sum number and to output the partial sum number to the adder. The MAC unit may be within a systolic array.

Yet another aspect of the subject matter includes a process of computing a result of at least one multiply and accumulate operation. A first number and a multiple number may be latched based on the first number using a first flip/flop. A second number may be loaded using a second flip/flop. A plurality of partial products may be produced based on the first number, the multiple, number, and the second number using a multiplexer. The plurality of partial products may be received from the multiplexer. A partial sum may be received using at least one carry save adder. At least two partially summed numbers may be produced based on the plurality of partial products and the partial sum using the at least one carry save adder. The at least two partially summed numbers may be received using a plurality of parallel segmented adders. An addition operation may be performed on the at least two partially summed numbers to compute the result. The second number may be encoded using Booth encoding. The multiple number may be computed using at least one hard multiple calculator. The process may include loading the partial sum and outputting the partial sum to the at least one carry save adder.

DETAILED DESCRIPTION

Figure 1A:
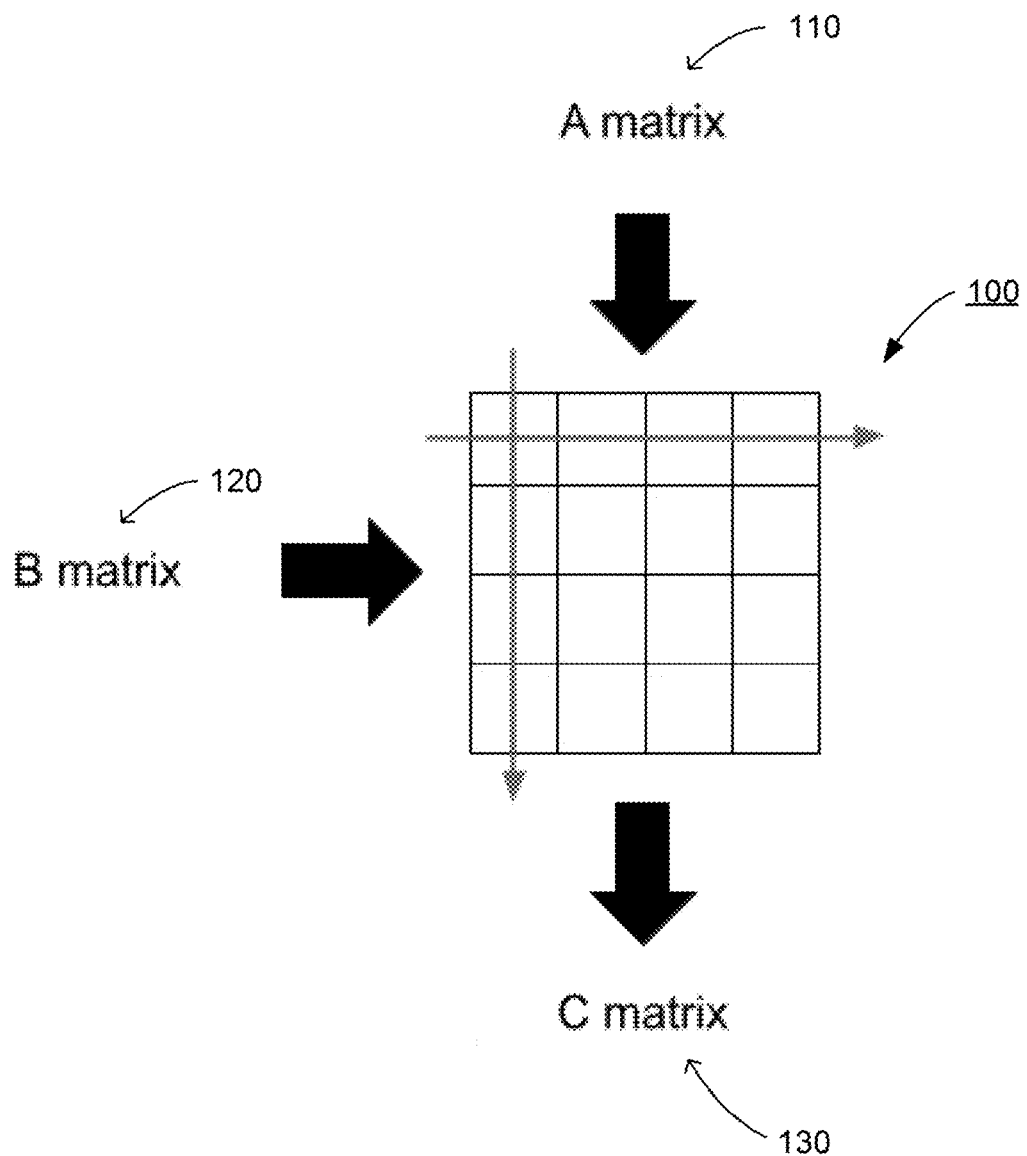
FIG. 1A depicts an example systolic array that is used to multiply the matrices A and B to produce an output matrix C.

FIG. 1A depicts an example systolic array 100 that is used to multiply the matrices A 110 and B 120 to produce an output matrix C 130. In particular, systolic array 100 may be a 2D array of multiply-and-accumulate (MAC) units with a weight-stationary approach used for dense matrix multiplication of matrix A 110 and matrix B 120 to produce matrix C 130. In some examples, systolic array 100 may be of size 4×4. The matrix C 130 may be derived by computing the dot products of each row in matrix A 110 and each column in matrix B 120. Thus, matrix C 130 may be the output of the systolic array 100. Each entry in systolic array 100 may represent a MAC unit that performs a dot product computation to generate the output matrix C 130. A scalar value in the matrix B 120 may move horizontally in the systolic array 100, so that it is used by several MAC units. Intermediate values between MAC units in the systolic array 100 may not be known.

Figure 1B:
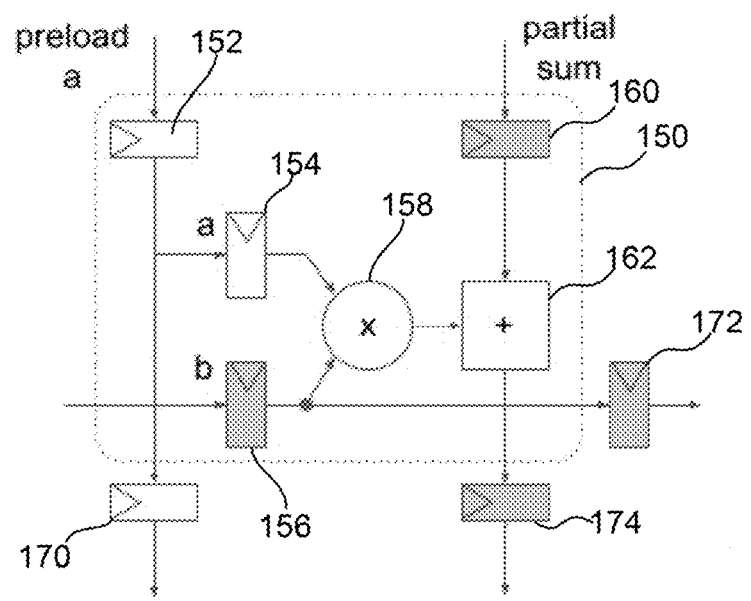
FIG. 1B depicts an example MAC unit that may be used in a systolic array used to multiply matrices A and B.

FIG. 1B depicts an example MAC unit 150 that may be used in a systolic array, used to multiply matrices A and B, such as the systolic array described in connection with FIG. 1A. The MAC unit 150 may include flip/flops 152, 154, 156, and 160, a multiplier 158, and an adder 162. FIG. 1B also shows additional flip/flops 170, 172, and 174, which may be within other MAC units in the systolic array.

Flip/flops 152 and 154 may preload and latch scalar values in matrix A. In particular, the flip/flop 152 may be used for preloading the value of a scalar value, a, of the matrix A and may pass this value to the flip/flop 154. The flip/flop 154 may be used for loading and latching the scalar value, a, and reusing this value several times in computations until it is reloaded. The flip/flop 156, may be used for loading a scalar value, b, of the matrix B. The scalar value, b, loaded in the flip/flop 156 may be used in each of the MAC units that are in a row of the systolic array, one after another. The multiplier 158 may multiply the two scalar numbers, a and b, that have been loaded and/or latched in the flip/flop 154 and in the flip/flop 156, respectively. In particular, the multiplier 158 may receive as inputs the scalar values, a and b, from the flip/flops 154 and 156, respectively, and may multiply these scalar values. The multiplier 158 may output the result of the multiplication to the adder 162. The flip/flop 160 may, for example, load and/or latch the partial sum that may have been output by a previous MAC unit in the systolic array. The adder 162 may receive as inputs the output of the multiplier 158 and the partial sum loaded and/or latched in the flip/flop 160, and may output the sum of these inputs as a partial sum output that may be stored by a flip/flop, such as flip/flop 174, of a downstream MAC unit in the systolic array. The additional flip/flops 170, 172, and 174 may be in other MAC units in the systolic array. An intermediate result may be the partial sum output by the adder 162 in a MAC unit. This partial sum may not be associated with MAC units at the bottom of the systolic array, and may not be used as a final result. Instead, a final result may be output by the adders of MAC units that are located at the bottom of the systolic array.

Based on the observations above, with respect to the operation of conventional MAC units within a systolic array, enhanced multipliers and adders for MAC units in a systolic array may be designed. In particular, design optimizations may be made to the MAC units in order to leverage how data is input and used and/or reused in a systolic array. In some examples the enhancements for the designs of the multipliers and adders may be applicable for general purposes. In some examples, the enhancements for the designs of the multipliers and adders may not be applicable for general purposes.

One of the obstacles for using high-radix multipliers, such as Booth3 or Booth 4 multipliers, in the MAC units in a systolic array may be hard multiples. As described above, this may be because such hard multiples may have to be computed before other steps in the multiplication of the scalar value, a, and the scalar value, b, are carried out. Based on the first observation above, hard multiples may be computed when preloading each scalar value, a, in the matrix A. The computed hard multiple may be used several times until a new scalar value, a, is preloaded by a MAC unit. The computed hard multiple may be off the critical path of multiplication and, in some examples, may be implemented in a multi-cycle operation. Therefore, a high-radix Booth multiplier may be used in a MAC unit in the systolic array. The high-radix Booth multiplier may not perform a hard multiple computation every clock cycle and may not perform a hard multiplier computation for use in a critical path of multiplication. The high-radix Booth multiplier may be faster than conventional multiplier due to its generation of fewer partial products.

Based on the second observation above, the scalar values, b, in the matrix B may initially be Booth encoded. Once the scalar values are Booth encoded, they may be streamed into the MAC units in the systolic array. Booth encoding the scalar values, b, prior to them being streamed into the systolic array may allow for the Booth encoding function to be offloaded from the critical path of multiplication performed by the multiplier in each MAC unit.

Each MAC unit in a systolic array may use an adder that adds a product from the multiplier in each MAC unit to the partial sum from the MAC unit/systolic array cell above. The MAC unit may then pass the result down to the MAC unit/systolic array cell below. Based on the third observation above, the adder in each MAC unit may be simplified. In particular, a partially redundant form may be used for each adder.

Figure 2:
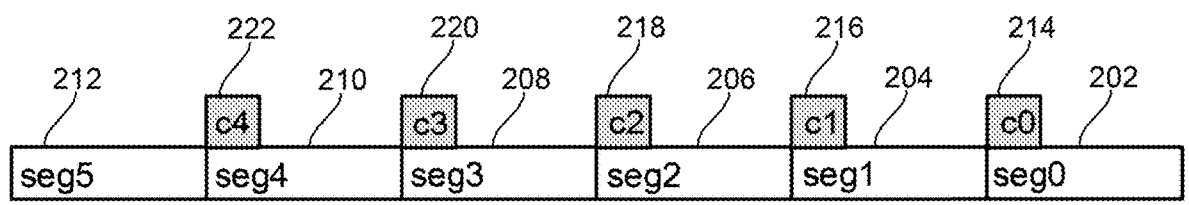
FIG. 2 depicts a partially redundant form of a number, which may be several bits long.

FIG. 2 depicts a partially redundant form of a number 200, which may be several bits long. In the partially redundant form, the number 200 may be represented using several smaller segments. For example, as shown in FIG. 2, if the number 200 is a 24-bit integer number, it may be represented as six 4-bit segments, such as segments 202, 204, 206, 208, 210, and 212, each segment except the last one may include a respective 1-bit carry, such as carries 214, 216, 218, 220, and 222 to the next segment. The last segment may not include or use a carry. Thus, the 24-bit integer number may be represented by a total of 6×4+5 bits=29 bits. Such a redundant form may be used for a partial sum in each MAC unit. This may be for a partial sum that is accumulated vertically, and in each MAC unit we may add a product from the multiplier, such as a 16-bit number if an 8-bit by 8-bit multiplication is being performed.

Each adder in a conventional MAC unit, such as adder 162 described in connection with FIG. 1B, may be replaced by parallel segmented adders. Based on the partially redundant form of a number, such as the number 200, an appropriate number of segmented adders may operate in parallel within each MAC unit.

For example, for the number 200 of FIG. 2, six 4-bit adders, one for each segment associated with the number 200, may be operated in parallel. The carry from the MAC unit/systolic array cell above, if there is one, may be used in the adding operation performed by each MAC unit in the systolic array. The carry output by each MAC unit may be passed down to the MAC unit/systolic array cell below, if there is one. At the bottom of the systolic array, the partially redundant form may be converted to a non-redundant form.

Figure 3:
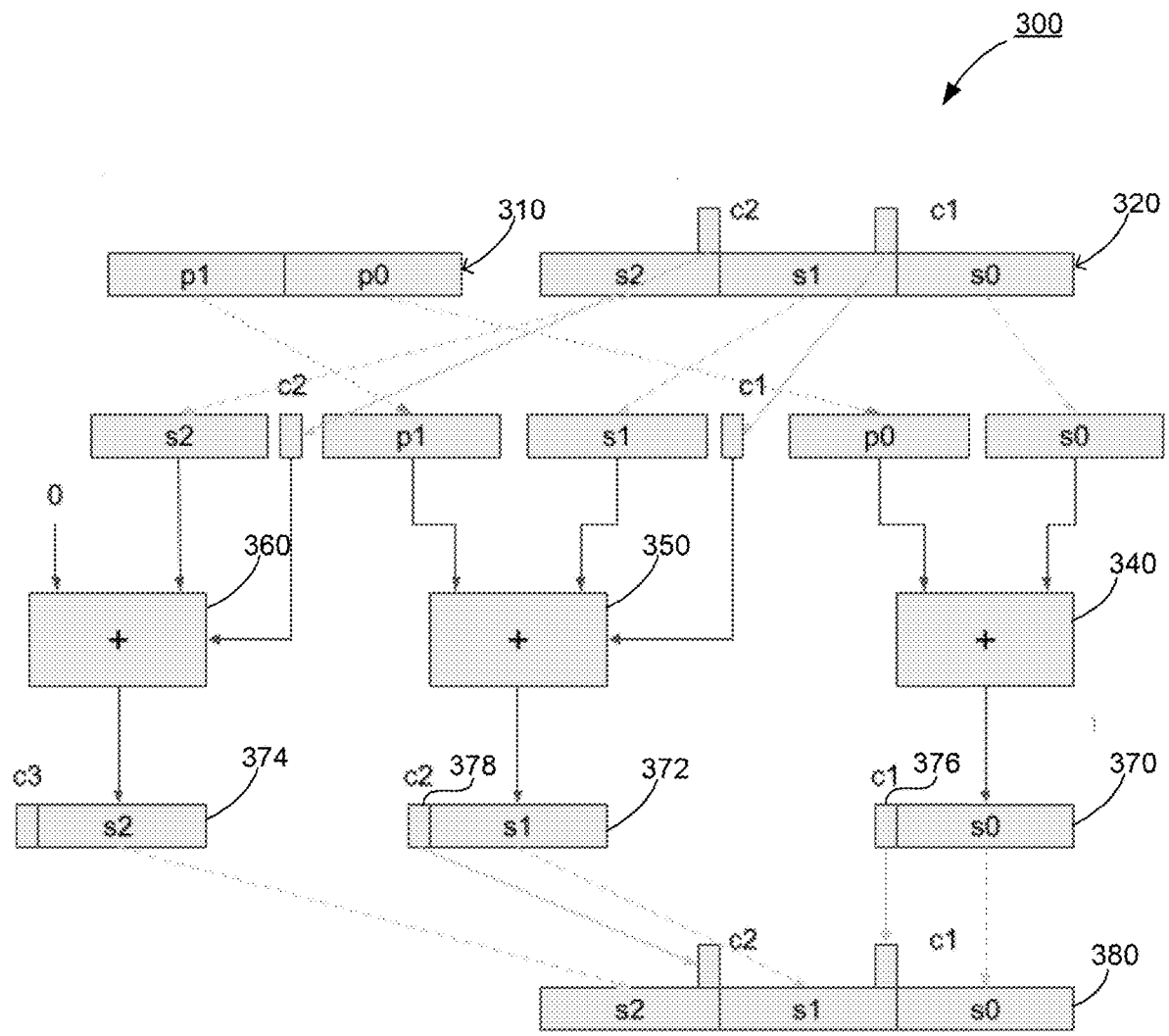
FIG. 3 depicts an example operation performed using parallel segmented adders in each MAC unit in the systolic array.

FIG. 3 depicts an example operation 300 performed using parallel segmented adders in each MAC unit in a systolic array. In FIG. 3, parallel segmented adders are used to add a product from the multiplier in each MAC unit to the partial sum from the MAC unit/systolic array cell above. In example operation 300, a 16-bit number 310 that is a product from the multiplier in each MAC unit that includes two 8-bit segments is added to a 24-bit partial sum 320 in partially redundant form that includes three 8-bit segments. The number 310 and the partial sum 320 are added using three 8-bit parallel segmented adders.

The 16-bit number 310 may be represented using two segments p1 and p0. The number p1:p0 may be a 16-bit product. In each systolic array MAC unit, this number may be the product output from its multiplier. Moreover, the 24-bit partial sum 320 in partially redundant form may be represented using the segments s2, s1, and s0, as well as carries c2 and c1. The number s2:s1:s0 and c2:c1 may represent the 24-bit partial sum in a partially redundant form using three 8-bit segments along with two carry bits. The partial sum may be received from the MAC unit/systolic array cell above each MAC unit in the systolic array.

The two numbers, such as the 16-bit product number 310 and the partial sum 320, may be added using multiple parallel segmented adders. For example, 16-bit product number 310 and the partial sum 320 may be added using the three 8-bit parallel segmented adders 340, 350, and 360. Although not shown, the carry from the MAC unit/systolic array cell above each MAC unit in the systolic array may be received and used as input to the first of the parallel segmented adders 340. The carry that may be output by the last parallel segmented adder may not propagate to the next segment, but rather it may be passed to the MAC unit/systolic array cell below each MAC unit. The output of the parallel segmented adders 340, 350, and 360 may be the segments 370, 372, and 374, respectively, along with the carries 376 and 378. Together the segments 370, 372, and 374 with carries 376 and 378 may form the final result 380 of the operation 300 performed using parallel segmented adders.

Although operation 300 shows a 16-bit number 310 that is a product from the multiplier added to a 24-bit partial sum 320, any length numbers or partial sums may be added in a similar manner. Additionally, although 8-bit segments and a particular number of carries are shown in FIG. 3, any substantially equal sized segments and any number of carries may be used in a similar manner as in FIG. 3. In addition, although three parallel segmented adders are shown in FIG. 3, a greater or fewer number of parallel segmented adders may be used in a similar manner as in FIG. 3.

A Carry-Save Adder (CSA) may be used by the multiplier in each MAC unit. The CSA may be a digital adder, which may be used in the multiplier, to compute the sum of three or more input numbers as a part of the multiplication operation. The CSA may output two numbers, which may be summed to produce the final result of the original numbers to be summed. The CSA may be associated with a tree, which may have several levels of additions to be performed by the CSA to output the two numbers used to produce the final result of the original summation. A Carry-Propagation Adder (CPA) may be used in the multiplier and the adder in each MAC unit to properly compute the carry bit(s) when segments are added together.

Figure 4A:
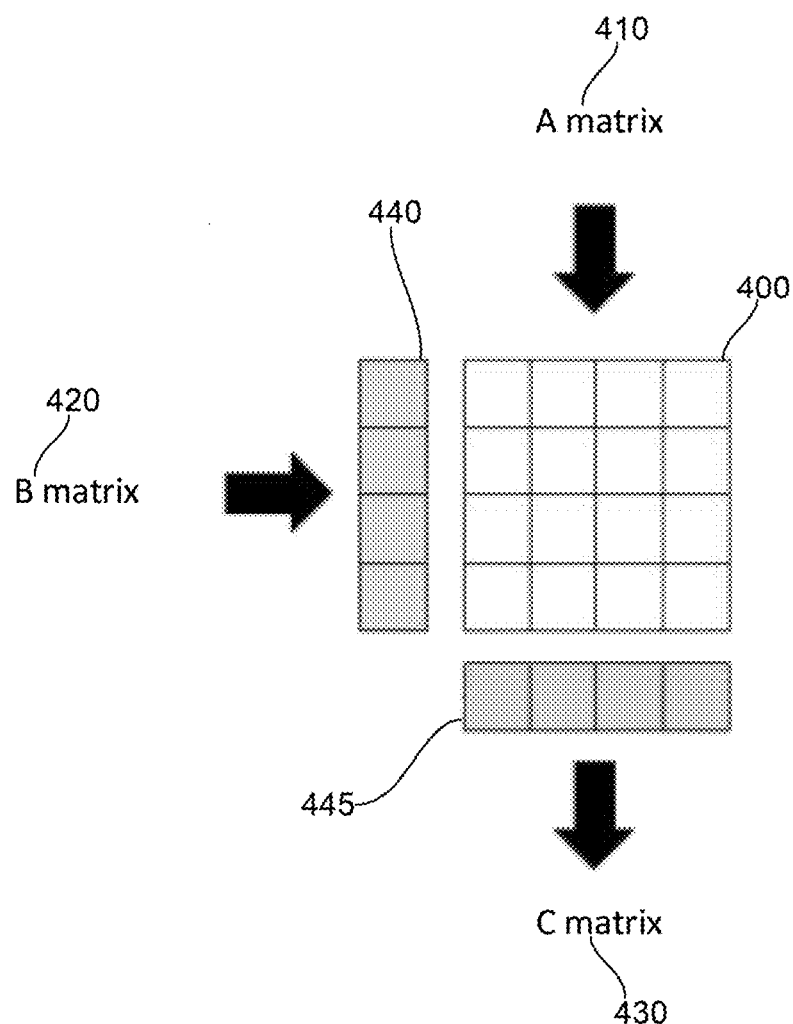
FIG. 4A depicts another example systolic array that is used to multiply the matrices A and B to produce an output matrix C.

FIG. 4A depicts an example systolic array 400 that is used to multiply the matrices A 410 and B 420 to produce an output matrix C 430. In particular, systolic array 400 may be a 2D array of multiply-and-accumulate (MAC) units with a weight-stationary approach used for dense matrix multiplication of matrix A 410 and matrix B 420 to produce matrix C 430. In some examples, systolic array 400 may be of size 4×4. FIG. 4A also shows Booth encoder 440 as well as bottom CPA 445. Booth encoder 440 may be used to Booth encode the scalar values, b, in the matrix B 420. Once these scalar values are Booth encoded, they may be streamed into the MAC units in the systolic array 400. Booth encoding the scalar values, b, prior to these values being streamed into the systolic array 400, may allow for the Booth encoding function to be offloaded from the critical path of the multiplier in each MAC unit. The output b values of the Booth encoder 440, and the scalar values of the matrix A 410 may be used as input to a fused multiplier and adder in each MAC unit in the systolic array 400. The fused multiplier and adder may be used in computing, at least partially, the dot products of each row in matrix A 410 and each column in matrix B 420. CPA 445 may operate similar to the several parallel segmented adders implemented as a CPA described above. The outputs of the fused multiplier and adder in MAC units at the bottom of the systolic array 400 may be output to bottom CPA 445 to be added to produce the values of the matrix C 430.

Figure 4B:
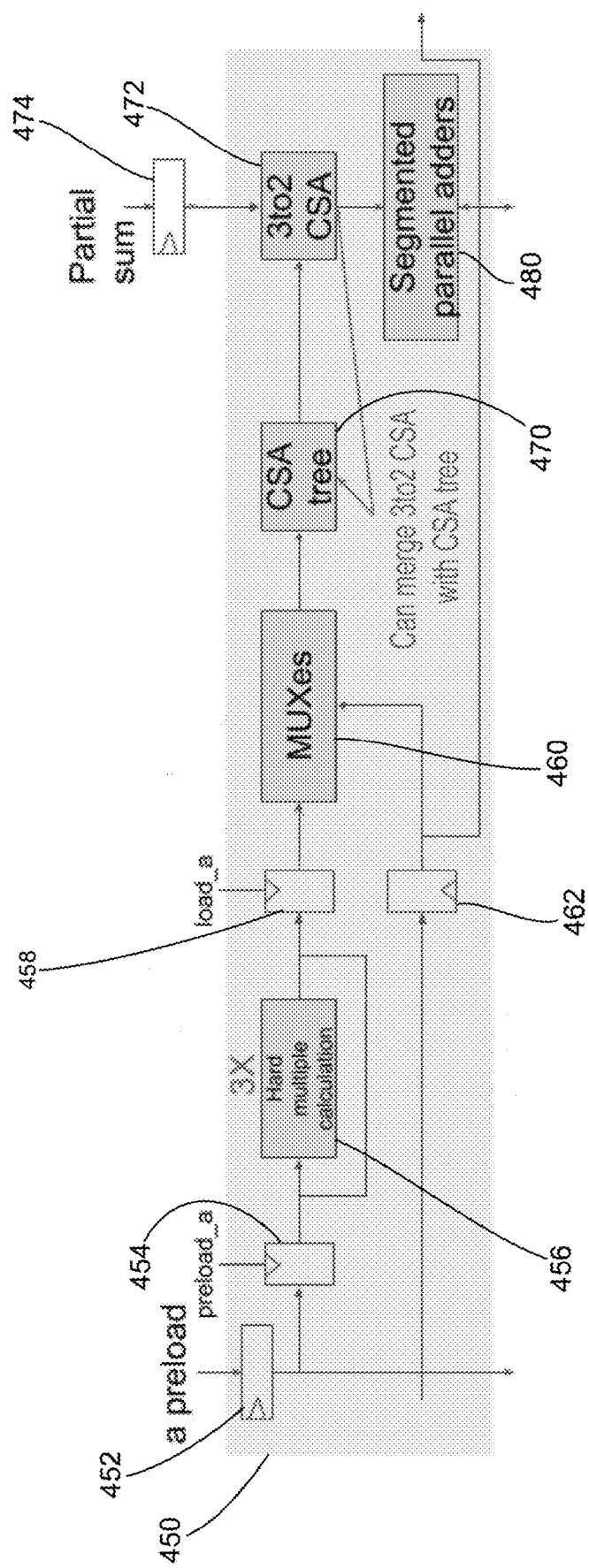
FIG. 4B depicts a MAC unit that may be used in a systolic array, used to multiply matrices A and B, such as the systolic array described in connection with FIG. 4A.

FIG. 4B depicts a MAC unit 450 that may be used in a systolic array, used to multiply matrices A and B, such as the systolic array described in connection with FIG. 4A. The MAC unit 450 may be used in a systolic array, such as systolic array 400 described in connection with FIG. 4A. The MAC unit 450 may include a fused version of the conventional multiplier and adder found in a conventional MAC unit, such as MAC unit 150 of FIG. 1B. The MAC unit 450 may include flip/flops 452, 454, 458, and 462, hard multiple calculator 456, multiplexer 460, CSA tree 470, 3-to-2 CSA 472, and parallel segmented adders 480.

The flip/flops 452 and 454 may be used for preloading and latching scalar values in the matrix A. In particular, the flip/flop 452 may be used for preloading the value of a scalar value, a, of the matrix A and outputting this value to the flip/flop 454. The flip/flop 454 may be used for loading and latching the scalar value, a, from flip/flop 452 and reusing this value several times in computations until it is reloaded. Thus, loading and latching the scalar value, a, may involve a single clock cycle or only a few clock cycles. The flip/flop 454 may output the value it receives to a hard multiple calculator 456. The hard multiple calculator 456 may receive the scalar value, a, which has been preloaded and latched by the flip/flops 452 and 454. The hard multiple calculator 456 may multiply the number that it receives by one or more integer multiples, in order to pre-calculate hard multiples, and output the result of the multiplication(s) to flip/flop 458. In particular, the hard multiple calculator 456 may output hard multiples of the scalar value a. Each hard multiple of a may be any multiple that is not a power of 2. For example, the hard multiple calculator 456 may output the multiples ±3a, ±5a, and/or ±7a to flip/flop 458. The pre-calculation of the hard multiples may occur in one clock cycle or a few clock cycles, and may not have to occur every clock cycle. Thus, the hard multiple calculation may be off the critical path of multiplication. The flip/flop 458 may receive the scalar value, a, from flip/flop 454 and/or from hard multiple calculator 456. In addition, the flip/flop 458 may receive the value(s) output by hard multiple calculator 456. The flip/flop 458 may load and/or latch the values that it receives and may output these values to multiplexer 460.

The flip/flop 462 may be used for loading a Booth encoded scalar value, b, of the matrix B. For example, the scalar value, b, of the matrix B may be Booth3 encoded and loaded, such as by Booth encoding using a radix of 8, and loading the result to the flip/flop 462. The Booth encoded scalar value, b, loaded in the flip/flop 462 may be used in each of the MAC units that are in a row of the systolic array, one after another. The flip/flop 462 may output the loaded Booth encoded value of b to the multiplexer 460.

The multiplexer 460 may take as inputs the value of a, the Booth encoded value of b, and the hard multiples of a that it receives, and it may output several partial products to the CSA tree 470. For example, the multiplexer 460 may receive the value of a from flip/flop 458, the values of the hard multiples of a from hard multiple calculator 456, and the Booth encoded value of b from flip/flop 462, and may output three partial products to the CSA tree 470. The multiplexer 460 may be used to implement, for example, a Booth3 multiplication of the inputs.

The CSA tree 470 may be an altered version of a conventional CSA, which may contain solely the first level of a multi-to-two CSA. This may mean that the CSA tree 470 may accept multiple inputs and output two numbers. For example, CSA tree 470 may include a first level of a 3-to-2 CSA, and may accept three input numbers and may output two numbers. In some examples, depending on the number of bits that can be multiplied by the multiplier, there may be many levels of CSAs, such as 3-to-2 and/or a 4-to-2 CSA, which may be referred to as a CSA tree. The numbers output by CSA tree 470 may each be in a partially redundant form. These numbers may be added to a partially redundant form of the partial sum from the MAC unit/systolic array cell above. The flip/flop 474, which may or may not be a part of the MAC unit 450, may load and/or latch the partial sum from the MAC unit/systolic array cell above MAC unit 450. The flip/flop 474 may output this value to a multi-to-two CSA, such as the 3-to-2 CSA 472.

In the MAC unit 450, partially redundant forms of the numbers output by the CSA tree, which may represent the product of a conventional multiplier, may be added to a partially redundant form of the partial sum from the MAC unit/systolic array cell above. This addition may be performed using a multi-to-two CSA, such as the 3-to-2 CSA 472. Moreover, in the MAC unit 450, which includes a fused version of a conventional MAC unit multiplier and adder, the CPA used in a conventional multiplier may not be used, i.e., skipped. This addition operation performed by the 3-to-2 CSA 472 may be performed in a similar manner as the operation 300, described in connection with FIG. 3. For example, two 16-bit numbers in partially redundant form output by the CSA tree 470 may be added to the 24-bit number and 5 carry bits of the partially redundant form of the partial sum from the flip/flop 474. The result may be reduced using the 3-to-2 CSA 472, which may accept three numbers as input and output two numbers. In particular, the two numbers from the CSA tree 470, such as the two 16-bit numbers, which may represent the output of the multiplier may be input to the 3-to-2 CSA 472 along with the partial sum number, such as the 24-bit number. The output of the 3-to-2 CSA 472 may be two numbers. For example, when two 16-bit numbers and a 24-bit number are added, the 3-to-2 CSA 472 may produce, as outputs, two 24-bit numbers. In some examples, the CSA tree 470 and the 3-to-2 CSA 472 may be combined into a single 4-to-2 CSA, which may replace the CSA tree 470 and the 3-to-2 CSA 472. The resulting 4-to-2 CSA may accept as inputs the same three inputs typically received by CSA tree 470 as well as the partial sum number that is typically input to the 3-to-2 CSA 472. The resulting 4-to-2 CSA may output the two numbers typically output by 3-to-2 CSA 472.

The numbers output by the 3-to-2 CSA 472 may be added, for example, by the several parallel segmented adders 480. For MAC units at the bottom of a systolic array, the parallel segmented adders may be implemented as a bottom CPA. For example, if Booth3 encoding and multiplication is performed, six 4-bit parallel segmented adders may be used to perform this addition. This addition may produce a number that is output by the parallel segmented adders 480, which represents the output of the MAC unit 450. For example, the number output by the MAC unit 450 may include 24-bits with 5 carry bits in a partially redundant form.

In the MAC unit 450, the multiplier and adder conventionally found in a MAC unit may be fused together to produce an enhanced MAC unit design. The enhanced MAC unit design may be more efficient and optimized for performing matrix multiplication, may include less hardware, and may be more energy efficient when compared to a conventional MAC unit design. The enhanced MAC unit design may include these and other advantages when it is used for matrix multiplication in a systolic array, such as those used for accelerators for DNNs.

The examples above, as related to the MAC unit 450, may be described as using Booth3 encoding and multiplication. However, if the precision of the numbers that are to be multiplied and/or accumulated are higher, such as multiplication of a 24-bit number with another 24-bit number, a higher-radix Booth design for the MAC unit may be used. In some examples, if such a higher-radix Booth design is used, hard multiple calculation may involve greater complexity, but may be accomplished by preloading and latching the next scalar value, a, of the matrix A. Alternatively or additionally, the hard multiple calculation may be performed as a multi-cycle operation. A higher-radix Booth design for the MAC unit may also involve increasing the height of the CSA tree 470, possibly tuning the parallel segmented adders 480, as well as adjusting the partially redundant form of the numbers being input and output by the components of the MAC unit. For example, the parallel segmented adders 480 may include eight 6-bit adders that are used to perform 48-bit addition.

The complexity of a multiplier within a MAC unit may be notated as $O(n^2)$ for n-bit by n-bit multiplication. The complexity of a multiplication operation and the MAC until multiplier may be affected by the multiplicand number and the multiplier number involved in the multiplication. In particular, the precision of multiplicand, such as the scalar value, a, of the matrix A, may affect hard multiple calculation, the width of the carry save adder tree reduction, and the final carry propagation adder. The precision of what is multiplied by the multiplicand, the multiplier, such as the scalar value b of the matrix B, may affect the height of the carry save adder tree reduction. As described above, in some examples, hard multiples may be pre-calculated. In such examples, the width of the reduction tree may be mostly on the area of the tree rather than the critical path. In addition, in such examples, the final carry propagation adder may be intermixed with the parallel segmented adder. Therefore, in such examples, the precision of the scalar value, a, of the matrix A may not impact the latency of computations as significantly as the precision of the scalar value, b, of the matrix B. Thus, in some examples, asymmetric precision may be used in the values/numbers input to a systolic array, and the higher precision may be used for the matrix A rather than the matrix B. In these examples, the matrix that includes higher precision numbers may be defined to be the matrix A. For example, 16-bit or 32-bit integers may be used for the matrix A, while the matrix B may include 8-bit integers.

Although the preceding examples assumed the use of integer arithmetic, floating point arithmetic may be performed using a systolic array with each MAC unit, such as systolic array 400 and MAC unit 450, described in connection with FIGS. 4A and 4B, respectively. The techniques as proposed above may be applied to floating point arithmetic for mantissa multiplication in a similar manner as described above with regards to integer arithmetic. The techniques as proposed above may also be applied to block floating point arithmetic and related number formats in a similar manner as described above with regards to integer arithmetic. The partially redundant form of a number, such as a partially redundant form of a number 200 described in connection with FIG. 2, and parallel segmented adders, such as parallel segmented adders 480 described in connection with FIG. 4B, may also be used for performing floating point arithmetic by a MAC unit. However, additional changes in the design of the MAC unit may be needed for such floating point arithmetic to be performed.

Figure 5:
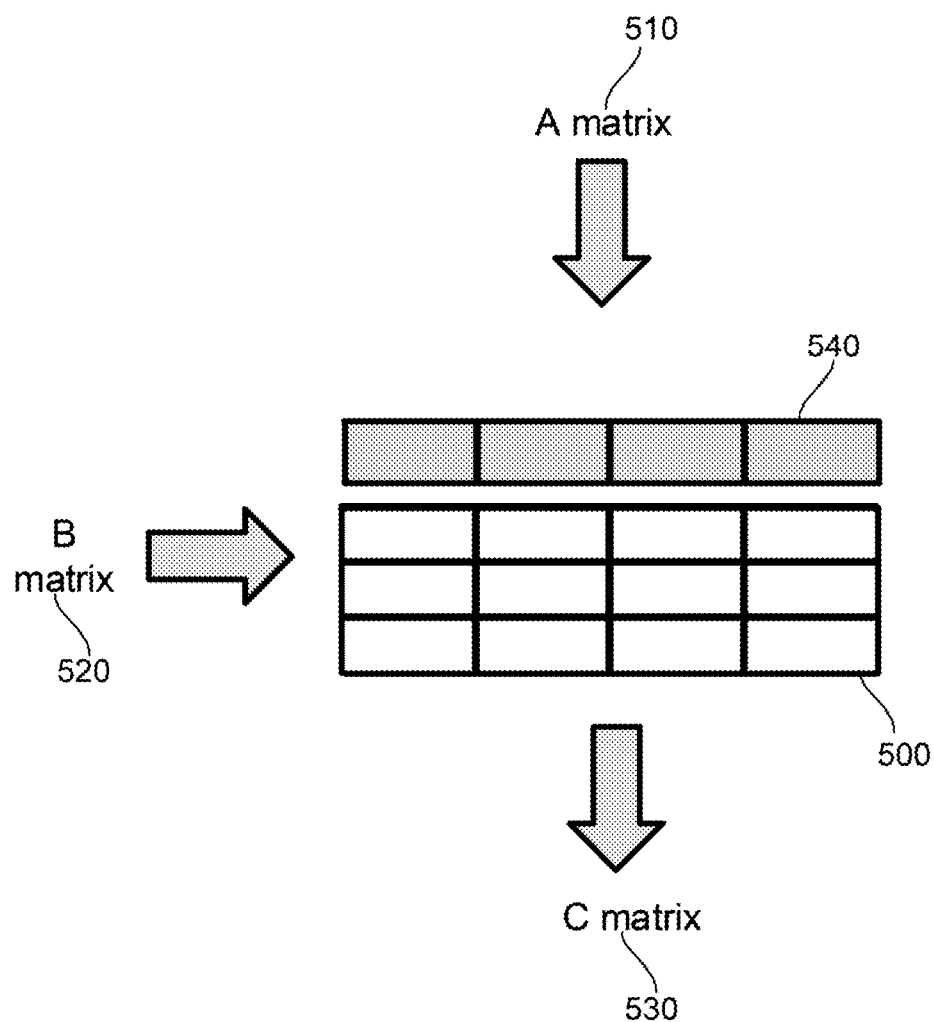
FIG. 5 depicts yet another example systolic array that is used to multiply the matrices A and B to produce an output matrix C.

FIG. 5 depicts an example systolic array 500 that is used to multiply the matrices A 510 and B 520 to produce an output matrix C 530. In particular, systolic array 500 may be a 2D array of multiply-and-accumulate (MAC) units with a weight-stationary approach used for dense matrix multiplication of matrix A 510 and matrix B 520 to produce matrix C 530. In some examples, systolic array 500 may be of size 4×4. FIG. 5 also shows hard multiple calculator 540. The hard multiple calculator 540 may receive the scalar value, a, of the matrix A 510. The hard multiple calculator 540 may multiply the number that it receives by one or more integer multiples, in order to pre-calculate one or more hard multiple(s), and output the result of the multiplication(s) to MAC units in the systolic array 500. In particular, the hard multiple calculator 540 may output the hard multiple(s), which may each be any multiple that is not a power of 2, of the value a. For example, the hard multiple calculator 540 may output the multiples ±3a, ±5a, and/or ±7a. The pre-calculation of the hard multiple(s) may occur in one clock cycle or a few clock cycles and may not need to be recalculated for several cycles. Thus, the pre-calculation of the hard multiple(s) may not have to occur every clock cycle, which may allow for computational efficiency. Therefore, the hard multiple calculation(s) may be off the critical path of multiplication. The scalar values of the matrix A 510, the hard multiple(s) output by the hard multiple calculator 540, and the scalar values, b, of the matrix B 520 may be used as input to a fused multiplier and adder in each MAC unit in the systolic array 500. The fused multiplier and adder may be used in computing, at least partially, the dot products of each row in matrix A 510 and each column in matrix B 520 to produce the rows and columns of the matrix C 530.

The area overhead of a higher-radix Booth multiplier used in a MAC unit may be reduced by sharing hard multiple calculators. One design technique may be to place a hard multiple calculator at the top of the systolic array, such as hard multiple calculator 540 shown as being at the top of systolic array 500. This hard multiple calculator may be used when the matrix A 510 is loaded. As such, each MAC unit in the systolic array may not include a hard multiple calculator. Using this technique, additional wires may be used to pass the calculated hard multiple(s) to the MAC units in the systolic array. By placing the hard multiple calculator at the top of the systolic array, the functionality of each of the MAC units in the systolic array may not change. For example, any software that may be used to perform the computations in each MAC unit need not know whether or not a hard multiple is calculated before the matrix A is pushed into the systolic array. As will be described in greater detail, FIG. 6A, below, demonstrates a technique that may use a hard multiple calculator at the top of a systolic array with additional wires that may be used to pass the calculated hard multiples.

Alternatively, the reloading of the scalar value, a, of the matrix A 510 may be at a rate faster than the normal clock speed. For example, for Booth3 multipliers, a and 3a may be initially pushed and then the reloading of the flip/flops with these values may occur at two times the normal clock speed. For example, the scalar value of a may be reloaded on the rising edge of the clock and 3a may be loaded on the falling edge of the clock. For this example, hard multiple calculator logic, which may be used to calculate the hard multiples such as 3a, may also be designed to match this faster clock speed. As will be described in greater detail, FIG. 6B, below, demonstrates a technique that may reload the scalar value of a at a faster than normal clock rate.

Another design technique may be to share hard multiple calculators in a portion of adjacent MAC units in the systolic array. For example, two vertically adjacent MAC units or 2×2 MAC units in the systolic array may share one hard multiple calculator. Using this technique, additional wires, which may be local wires, may be used to distribute hard multiples. Using this technique, the scalar values of a and the hard multiple(s) of a may alternatively be reloaded at a higher clock rate.

Figure 6A:
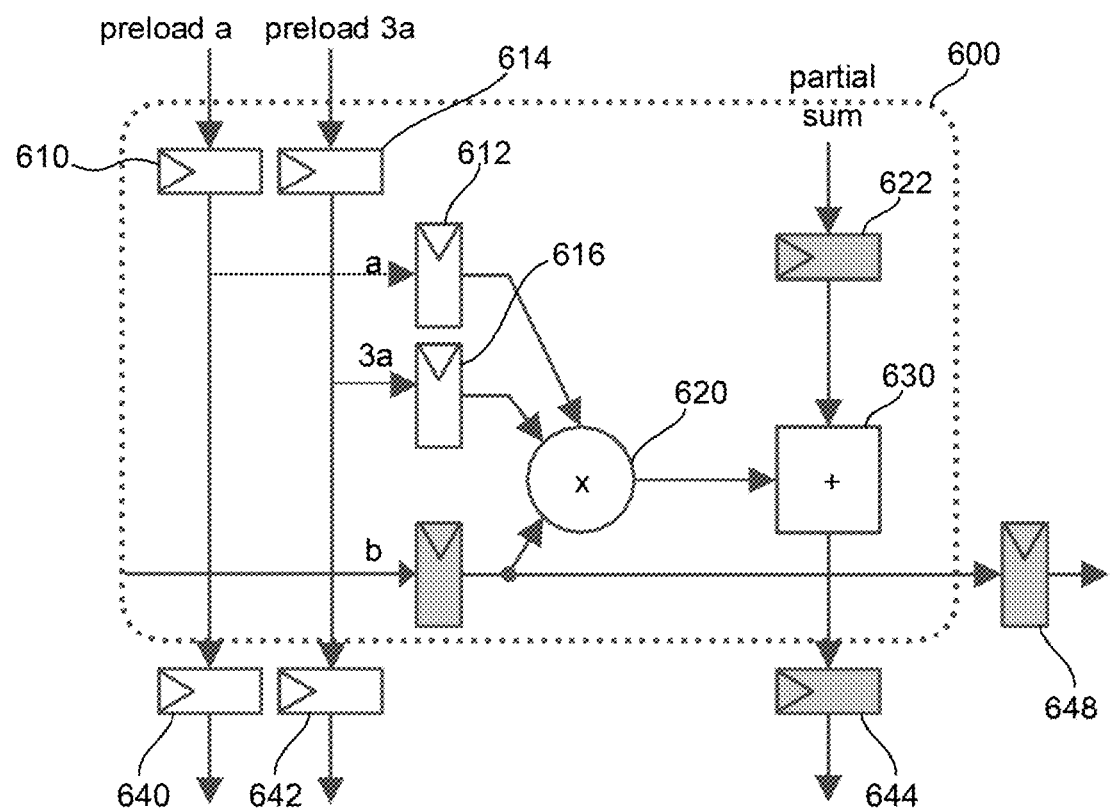
FIG. 6A depicts a MAC unit, which may be used in a systolic array, used to multiply matrices A and B, such as the systolic array described in connection with FIGS. 4A and/or 5.

FIG. 6A depicts a MAC unit 600 that may be used in a systolic array, used to multiply matrices A and B. For example, the MAC unit 600 may be in the systolic array described in connection with FIGS. 4A and/or 5. The MAC unit 600 may include flip/flops 610, 612, 614, 616, 618, and 622, a multiplier 620, and an adder 630. FIG. 6A also shows additional flip/flops 640, 642, 644, and 648, which may be in other MAC units in the systolic array.

The flip/flops 610 and 612 may preload and latch scalar values in the matrix A. In particular, the flip/flop 610 may be used for preloading a scalar value, a, of the matrix A and may pass this value to the flip/flop 612. The flip/flop 612 may be used for loading and latching the scalar value, a, and reusing this value several times in computations until it is reloaded. Flip/flops 614 and 616 may preload and latch hard multiple (s) of the scalar values in matrix A. In particular, the flip/flop 614 may be used for preloading pre-computed hard multiple (s) of the scalar value, a, of the matrix A and may pass these values to the flip/flop 616. The flip/flop 616 may be used for loading and latching pre-computed hard multiple(s) of the scalar value, a, and reusing these values several times in computations until they are reloaded. The flip/flop 618, may be used for loading a scalar value, b, of the matrix B. The scalar value, b, loaded in the flip/flop 618 may be used in each of the MAC units that are in a row of the systolic array, one after another.

The multiplier 620 may multiply the values that have been loaded and/or latched in the flip/flop 612 and/or the flip/flop 616, and in the flip/flop 618. In particular, the multiplier 620 may receive as inputs the scalar value a and/or the hard multiples of the scalar value a, and the scalar value b from the flip/flops 612, 616, and/or 618, and may multiply one or more of these values to produce partial products. The multiplier 620 may output the result of the multiplication to the adder 630 included in the MAC unit 600. The flip/flop 622 may load and/or latch the partial sum that may have been output by a previous MAC unit in the systolic array. The adder 630 may receive as inputs the output of the multiplier 620 and the partial sum loaded and/or latched in the flip/flop 622, and may output the sum of these inputs as a partial sum output. This output may be stored by a flip/flop, such as flip/flop 644, of a downstream MAC unit in the systolic array. The additional flip/flops 640, 642, 644, and 648 may be in other MAC units in the systolic array. An intermediate result, which may be the partial sum output by the adder 630 in a MAC unit that is not in the bottom row of the systolic array, may not be used as a final result. Instead, a final result may be output by the adders of MAC units that are in the bottom row of the systolic array.

Figure 6B:
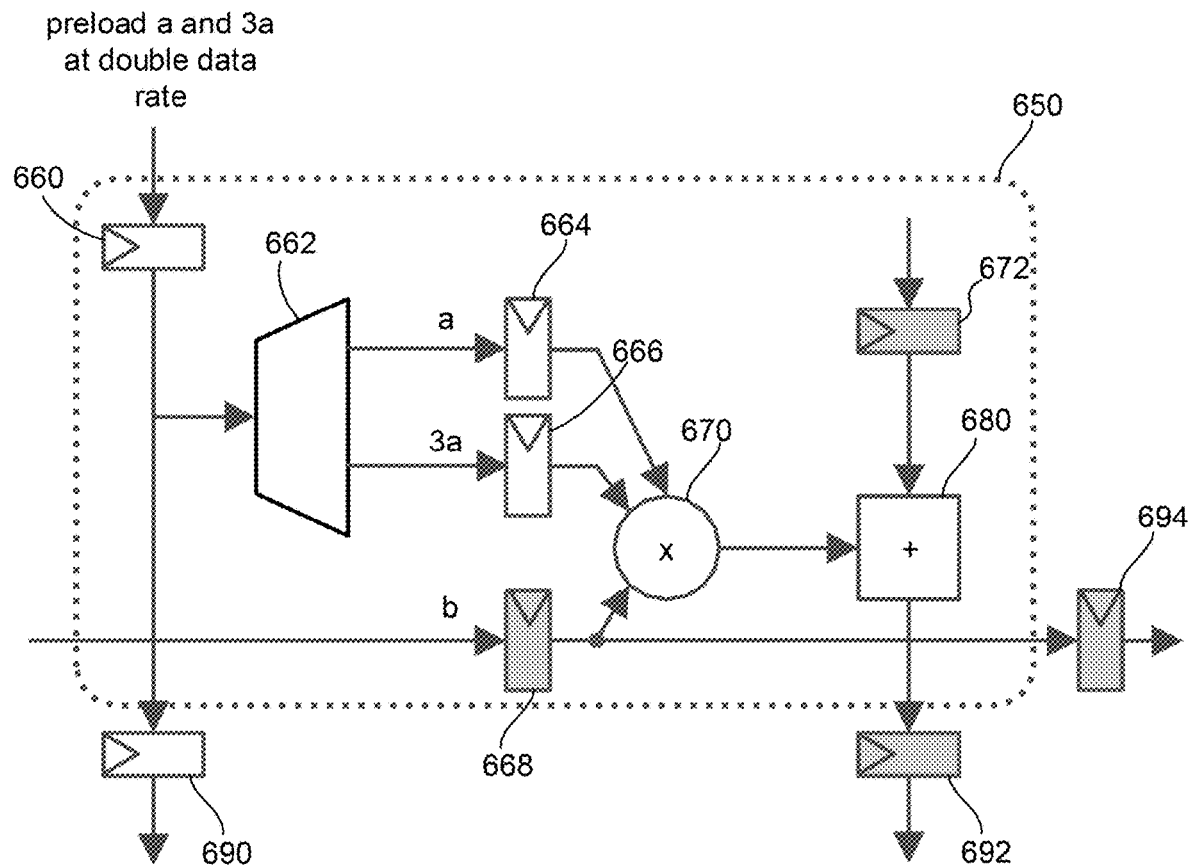
FIG. 6B depicts a MAC unit, which may be used in a systolic array, used to multiply matrices A and B, such as the systolic array described in connection with FIGS. 4A and/or 5.

FIG. 6B depicts a MAC unit 650 that may be used in a systolic array, used to multiply matrices A and B. For example, the MAC unit 650 may be in the systolic array described in connection with FIGS. 4A and/or 5. The MAC unit 650 may include, a demultiplexer 662, flip/flops 660, 664, 666, 668, and 672, a multiplier 670, and an adder 680. FIG. 6A also shows additional flip/flops 690, 692, and 694, which may be in other MAC units in the systolic array.

The flip/flop 660 may preload and/or latch scalar values in the matrix A as well as hard multiple(s) of these scalar values. In particular, the flip/flop 660 may be used for preloading a scalar value, a, of the matrix A as well as preloading pre-computed hard multiple(s) of the value a, and may pass these values to the demultiplexer 662. Flip/flop 660 may operate at a double data rate and thus may be considered to be a double data rate flip/flop. The demultiplexer 662 may be used for loading and latching the scalar value, a, as well as the pre-computed hard multiple(s) of a, and outputting these values to flip/flops 664 and 666, respectively. The flip/flop 664 may be used for loading and latching the scalar value, a, and reusing this value several times in computations until it is reloaded. The flip/flop 666 may be used for loading and latching pre-computed hard multiple(s)

of the scalar value, a, and reusing these values several times in computations until they are reloaded. The flip/flop 668, may be used for loading a scalar value, b, of the matrix B. The scalar value, b, loaded in the flip/flop 668 may be used in each of the MAC units that are in a row of the systolic array, one after another.

The multiplier 670 may multiply the values that have been loaded and/or latched in the flip/flop 664 and/or the flip/flop 666, and in the flip/flop 668. In particular, the multiplier 670 may receive as inputs the scalar value a and/or the hard multiple(s) of the scalar value a, and the scalar value b from the flip/flops 664, 666, and/or 668, and may multiply one or more of these values to produce partial products. The multiplier 670 may output the result of the multiplication to the adder 680 included in the MAC unit 650. The flip/flop 672 may, for example, load and/or latch the partial sum that may have been output by a previous MAC unit in the systolic array. The adder 680 may receive as inputs the output of the multiplier 670 and the partial sum loaded and/or latched in the flip/flop 672, and may output the sum of these inputs as a partial sum output. This output may be stored by a flip/flop, such as flip/flop 692, of a downstream MAC unit in the systolic array. The additional flip/flops 690, 692, and 694 may be in other MAC units in the systolic array. An intermediate result, which may be the partial sum output by the adder 680 in a MAC unit that is not in the bottom row of the systolic array may not be used as a final result. Instead, a final result may be output by the adders of MAC units that are in the bottom row of the systolic array.

Streaming in Booth encoded scalar values, b of the matrix B, instead of the unencoded scalar values of b may increase the number of wires in each MAC unit in the systolic array. For example, 8-bit multiplication using Booth3 encoding may use three sets of Booth encodings, each using five wires. In this example, a wire may be used for a, 2a, 3a, 4a, and the sign, where a, 2a, 3a, and 4a, are one-hot encoded, and except for 0, these four can be zeros. In this example, fifteen wires may be used, compared to eight wires for the unencoded 8-bit data. One way to reduce the number of wires may be to use another encoding. For example, 4-bit 2's complement signed representation may be used for Booth3 encoding. In this example, a number between −8 and +7 may be used to cover all possible cases between −4 and +4. In this example, each MAC unit, such as MAC unit 450 described in connection with FIG. 4B, may use a decoder to drive each multiplexer, such as multiplexer 460 described in connection with FIG. 4B. Another approach to input the scalar values, b, of the matrix B may be to use higher data rates similar to what is described above with reference to FIG. 6B. Using this approach, the scalar values, a, of the matrix A and the related hard multiple values are preloaded at a double data rate. For example, using this approach, eight wires may be used to transfer and/or load the Booth encoded scalar values, b, of the matrix B at double the normal clock rate, i.e., 2× data rates.

In some examples, an output stationary systolic array may be used. The output stationary systolic array may not keep/store an operand of the multiplier within each MAC unit. In addition, similar to what is described above, pre-calculated hard multiples may be passed down vertically in the output stationary systolic array. In these examples, the Booth encoded scalar values, b, of the matrix B may be streamed in. Additionally, in these examples, the partially redundant form of numbers may be used along with parallel segmented adders.

Figure 7:
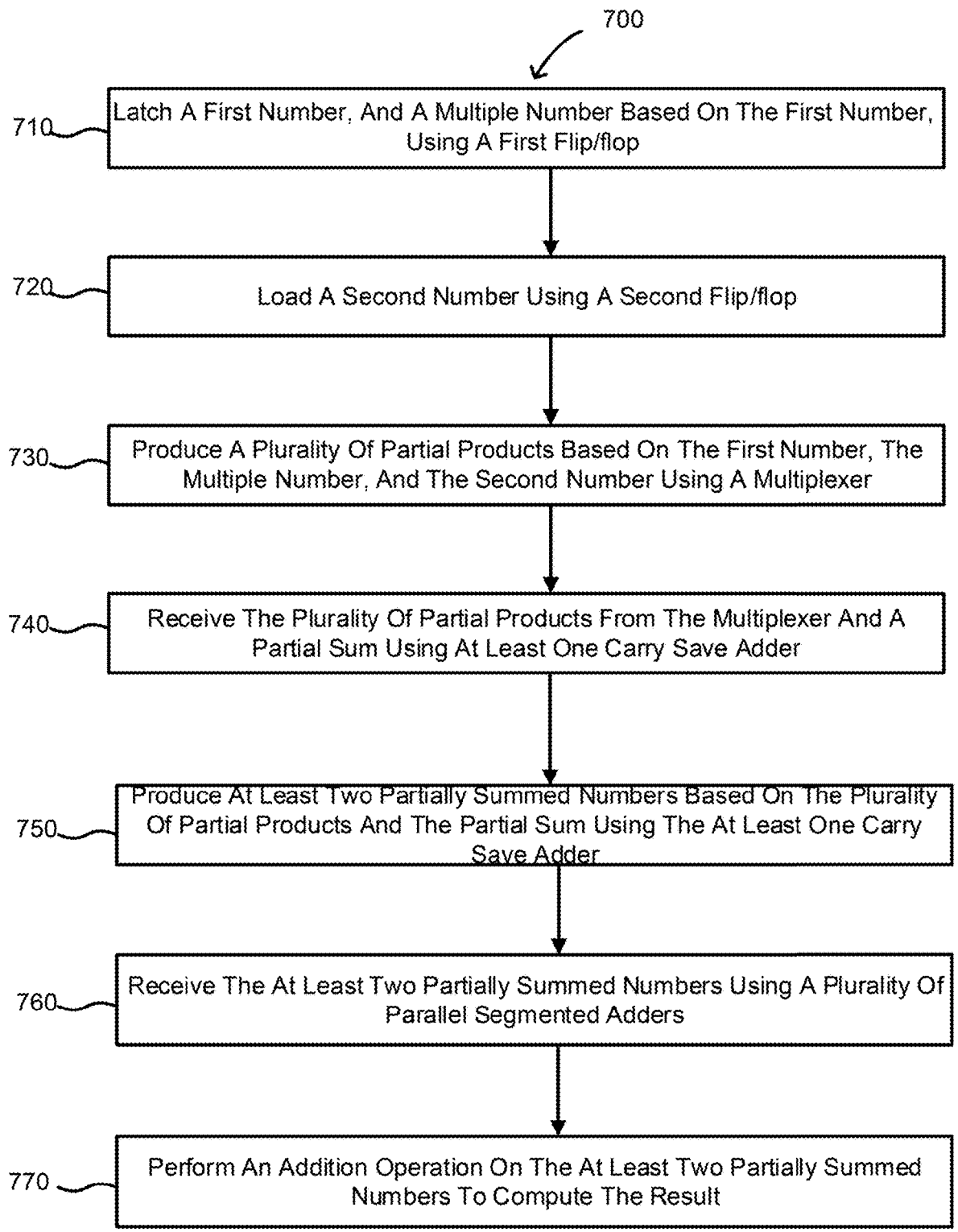
FIG. 7 is a flow diagram of an example process for computing a result of a multiply and accumulate operation.

FIG. 7 is a flow diagram of example process 700 for computing a result of at least one multiply and accumulate operation. The process 700 may be performed by various elements of a MAC unit, such as the MAC units described in connection with FIGS. 4B, 6A, and 6B.

In block 710, a first number, and a multiple number based on the first number, may be latched using a first flip/flop, such as the flip/flop 458 described in connection with FIG. 4B. For example, the scalar value, a, of a matrix A, and the hard multiple number value(s) may be latched. The latched numbers may be reused several times in computations in a systolic array until they are reloaded and/or relatched. These latched numbers may be output to a multiplexer.

In block 720, a second number may be loaded using a second flip/flop, such as the flip/flop 462 described in connection with FIG. 4B. For example, Booth encoded scalar value, b, of the matrix B may be loaded. The loaded number may be streamed into a systolic array of MAC units.

In block 730, a plurality of partial products may be produced based on the first number, the multiple number, and the second number using a multiplexer, such as the multiplexer 460 described in connection with FIG. 4B. For example, the multiplexer may take as inputs the value of a, the Booth encoded value of b, and the hard multiples of a that it receives, and it may output several partial products based on these numbers.

In block 740, the plurality of partial products and a partial sum may be received by at least one carry save adder, such as the CSA tree 470 and/or the 3-to-2 CSA 472 described in connection with FIG. 4B. The plurality of partial products may be received from the multiplexer, such as the multiplexer 460 described in connection with FIG. 4B. The partial sum may be loaded by and received from a flip/flop, such as the flip/flop 474 described in connection with FIG. 4B.

In block 750, at least two partially summed numbers may be produced based on the plurality of partial products and the partial sum using the at least one carry save adder, such as the 3-to-2 CSA 472 described in connection with FIG. 4B. For example, two partially summed 16-bit numbers in partially redundant form output by the CSA tree 470 described in connection with FIG. 4B may be added to a 24-bit number and 5 carry bits of a partially redundant form of the partial sum from the flip/flop 474 described in connection with FIG. 4B. The result may be reduced using the 3-to-2 CSA 472, which may accept three numbers as input and output two numbers. In particular, the two numbers from the CSA tree 470, such as the two 16-bit numbers, may be input to the 3-to-2 CSA 472 along with the partial sum number, such as the 24-bit number. The output of the at least one carry save adder may be two partially summed numbers. For example, when two 16-bit numbers and a 24-bit number are added, the 3-to-2 CSA 472 may produce, as outputs, two 24-bit numbers that may be output to parallel segmented adders.

In block 760, the at least two partially summed numbers may be received using several parallel segmented adders, such as parallel segmented adders 480 described in connection with FIG. 4B. Continuing with the previous example, the 3-to-2 CSA 472 may produce, as outputs, two 24-bit numbers, which may be the at least two partially summed numbers received by the parallel segmented adders 480.

In block 770, an addition operation may be performed on the at least two partially summed numbers to compute the result. The numbers output by the carry save adder may be added by the parallel segmented adders, such as the several parallel segmented adders 480. For example, if Booth3 encoding and multiplication is performed, six 4-bit parallel segmented adders may be used to perform this addition. This addition may produce a number that is output by the parallel segmented adders. This number may represent the output of the MAC unit that may perform the process 700. Continuing with the previous example, the number output by the MAC unit, such as MAC unit 450 described in connection with FIG. 4B, may include 24-bits with 5 carry bits in a partially redundant form.

While the operations of the process 700 are described in a particular order, it should be understood that the order may be modified and operations may be performed in parallel. Moreover, it should be understood that operations may be added or omitted.

Figure 8:
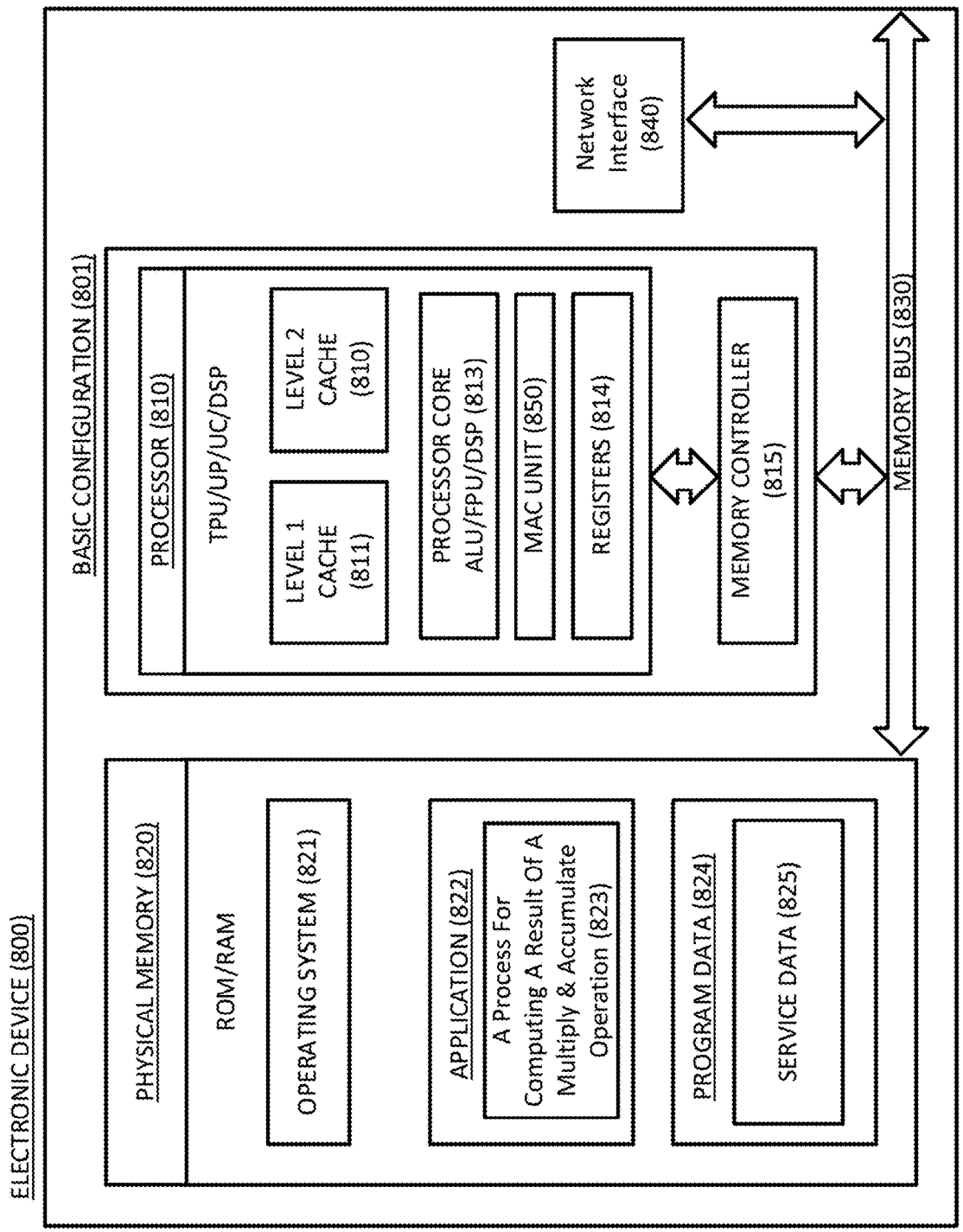
FIG. 8 depicts a block diagram of an example electronic device in accordance with aspects of the disclosure.

FIG. 8 depicts a block diagram of an example electronic device 800. The electronic device 800 may include one or more processor 810, such as one or more xPUs, system memory 820, a bus 830, the networking interface(s) 840, and other components (not shown), such as storage(s), output device interface(s), input device interface(s). A bus 830 may be used for communicating between the processor 810, the system memory 820, the networking interface(s) 840, and other components. Any or all components of electronic device 800 may be used in conjunction with the subject of the present disclosure.

Depending on the desired configuration, the processor 810 may be of any type including but not limited to a tensor processing unit (TPU), a microprocessor, a microcontroller, a digital signal processor (DSP), or any combination thereof. The processor 810 may include a systolic array, such as the systolic array described in connection with FIGS. 4A and/or 5. The processor 810 may include one more level of caching, such as a level one cache 811 and a level two cache 812, a processor core 813, one or more MAC unit(s) 850, and registers 814. The processor core 813 may include one or more arithmetic logic unit (ALU), one or more floating point unit (FPU), one or more DSP core, or any combination thereof. In some examples, one or more MAC unit(s) 850 may be implemented within processor core 813. A memory controller 815 may also be used with the processor 810, or in some implementations the memory controller 815 can be an internal part of the processor 810.

Depending on the desired configuration, the physical memory 820 may be of any type including but not limited to volatile memory, such as RAM, non-volatile memory, such as ROM, flash memory, etc., or any combination thereof. The physical memory 820 may include an operating system 821, one or more applications 822, and program data 824, which may include service data 825. Non-transitory computer-readable medium program data 824 may include storing instructions that, when executed by the one or more processing devices, implement a process for computing the result of a multiply and accumulate operation 823. In some examples, the one or more applications 822 may be arranged to operate with program data 824 and service data 825 on an operating system 821.

The electronic device 800 may have additional features or functionality, and additional interfaces to facilitate communications between the basic configuration 801 and any required devices and interfaces.

Physical memory 820 may be an example of computer storage media. Computer storage media includes, but is not limited to, RAM, ROM, EEPROM, flash memory or other memory technology, or any other medium which can be used to store the desired information and which can be accessed by electronic device 800. Any such computer storage media can be part of the device 800.

Network interface(s) 840 may couple the electronic device 800 to a network (not shown) and/or to another electronic device (not shown). In this manner, the electronic device 800 can be a part of a network of electronic devices, such as a local area network ("LAN"), a wide area network ("WAN"), an intranet, or a network of networks, such as the Internet. In some examples, the electronic device 800 may include a network connection interface for forming a network connection to a network and a local communications connection interface for forming a tethering connection with another device. The connections may be wired or wireless. The electronic device 800 may bridge the network connection and the tethering connection to connect the other device to the network via the network interface(s) 840.

One or more MAC unit(s) 850 may be used to perform multiply and accumulate operations, such as those operations needed to be performed for matrix multiplication. The one or more MAC unit(s) 850 may be a part of a systolic array. For example, the MAC unit(s) 850 and the systolic array in which it operates may be used in an accelerator that may be used for DNN implementations. The one or more MAC unit(s) 850 may be any one of the MAC units described above. For example, the MAC unit(s) 850 may be similar to and include MAC unit 450 described in connection with FIG. 4B, MAC unit 600 described in connection with FIG. 6A, and/or MAC unit 650 described in connection with FIG. 6B.

The MAC unit(s) 850 may be considered to be an enhanced MAC unit, such as one that includes a fused multiplier or adder or other enhancement described herein. Such an enhanced MAC unit may be more efficient, practical, optimized for performing matrix multiplications, may include less hardware, and may be more energy efficient when compared to a conventional MAC unit. The enhanced MAC unit may include these and other advantages when it is used for matrix multiplications in a systolic array, such as those used for accelerators for DNNs.

The electronic device 800 may be implemented as a portion of a small form factor portable (or mobile) electronic device such as a speaker, a headphone, an earbud, a cell phone, a smartphone, a smartwatch, a personal data assistant (PDA), a personal media player device, a tablet computer (tablet), a wireless web-watch device, a personal headset device, a wearable device, an application-specific device, or a hybrid device that include any of the above functions. The electronic device 800 may also be implemented as a personal computer including both laptop computer and non-laptop computer configurations. The electronic device 800 may also be implemented as a server, an accelerator, or a large-scale system.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. A multiply-and-accumulate (MAC) unit for multiplying two numbers to produce a result, the MAC unit comprising:
    a first flip/flop configured to load a multiple number and output the multiple number, the multiple number being a first number multiplied by another number;
    a second flip/flop configured to load a second number and output the second number;
    at least one multiplexer in communication with the first flip/flop and the second flip/flop, the at least one multiplexer configured to:
        receive the multiple number from the first flip/flop and the second number from the second flip/flop, and
        output a plurality of partial products based on the multiple number and the second number;
    at least one carry save adder in communication with the multiplexer, the at least one carry save adder configured to:
        receive the plurality of partial products from the at least one multiplexer and a partial sum derived from an additional MAC unit, and
        output at least two partially summed numbers based on the plurality of partial products and the partial sum; and
    a plurality of parallel segmented adders in communication with the at least one carry save adder, the plurality of parallel segmented adders configured to:
        receive the at least two partially summed numbers,
        represent the at least two partially summed numbers as at least three segments,
        respectively perform addition operations in parallel on the at least three segments to generate segmented numbers, wherein combining the segmented numbers forms the result, and
        output the result.

2. The MAC unit of claim 1, wherein the second number is encoded using Booth encoding.

3. The MAC unit of claim 1, further comprising at least one hard multiple calculator in communication with the first flip/flop and configured to receive the first number and output the multiple number to the first flip/flop.

4. The MAC unit of claim 1, wherein the at least one carry save adder includes a multi-to-two carry save adder.

5. The MAC unit of claim 1, wherein the at least one carry save adder includes a carry save adder and a multi-to-two carry save adder.

6. The MAC unit of claim 5, further comprising a third flip/flop configured to load the partial sum and to output the partial sum to the multi-to-two carry save adder.

7. The MAC unit of claim 6, wherein the partial sum is a result produced by the additional MAC unit.

8. The MAC unit of claim 1, wherein the segments of numbers are in a partially redundant form.

9. The MAC unit of claim 1, wherein the first flip/flop is configured to latch the multiple number at a rate faster than a clock rate.

10. The MAC unit of claim 1, wherein the at least one multiplexer is further configured to receive the first number from a third flip/flop and output the plurality of partial products based on the first number, the multiple number, and the second number.

11. The MAC unit of claim 1, wherein the MAC unit is within a systolic array.

12. A multiply-and-accumulate (MAC) unit, the MAC unit comprising:
    a first flip/flop configured to load a first number and output the first number;
    a second flip/flop configured to load a multiple number and output the multiple number, the multiple number being the first number multiplied by another number;
    a third flip/flop configured to load a second number and output the second number, wherein the first number and the multiple number are loaded at an increased data rate compared to loading the second number;
    a multiplexer in communication with the first, second, and third flip/flops, the multiplexer configured to:
        receive the first number from the first flip/flop, the multiple number from the second flip/flop, and the second number from the third flip/flop,
        produce a partial product based on the first number, the multiple number, and the second number, and
        output the partial product; and an adder in communication with the multiplexer, the adder configured to:
        receive the partial product from the multiplexer and a partial sum number derived from an additional MAC unit,
        add the partial product with the partial sum number to produce a result, and
        output the result.

13. The MAC unit of claim 12, further comprising an increased data rate flip/flop configured to load the first number and the multiple number at a rate faster than a clock rate.

14. The MAC unit of claim 13, further comprising a demultiplexer in communication with the increased data rate flip/flop, the first flip/flop, and the second flip/flop, the demultiplexer configured to:
  receive the first number and the multiple number from the increased data rate flip/flop;
  output the first number to the first flip/flop; and
  output the multiple number to the second flip/flop.

15. The MAC unit of claim 12, further comprising a fourth flip/flop in communication with the adder and configured to load the partial sum number and to output the partial sum number to the adder.

16. The MAC unit of claim 12, wherein the MAC unit is within a systolic array.

17. A method of computing a result of at least one multiply and accumulate operation, the method comprising:
  loading a multiple number using a first flip/flop, the multiple number being a first number multiplied by another number;
  loading a second number using a second flip/flop;
  producing a plurality of partial products based on the multiple number and the second number using a multiplexer;
  receiving the plurality of partial products and a partial sum from an additional MAC unit using at least one carry save adder;
  producing at least two partially summed numbers based on the plurality of partial products and the partial sum using the at least one carry save adder;
  receiving the at least two partially summed numbers using a plurality of parallel segmented adders;
  representing the at least two partially summed numbers as at least three segments; and
  respectively performing addition operations in parallel on the at least three segments to generate segmented numbers, wherein combining the segmented numbers forms the result.

18. The method of claim 17, further comprising encoding the second number using Booth encoding.

19. The method of claim 17, further comprising computing the multiple number using a hard multiple calculator.

20. The method of claim 17, further comprising loading the partial sum and outputting the partial sum to the at least one carry save adder using a third flip/flop.

* * * * *